United States Patent
Habenicht et al.

[19]

[11] Patent Number: 5,890,956
[45] Date of Patent: Apr. 6, 1999

[54] APPARATUS FOR PROCESSING POULTRY LEGS

[75] Inventors: Frank Habenicht, Sereetz; Siegbert Wruck, Stralsund; Klaus Ziebell, Lübeck, all of Germany

[73] Assignee: Nordischer Maschinenbau Rud. Baader GmbH + CO KG, Germany

[21] Appl. No.: 873,369

[22] Filed: Jun. 12, 1997

[51] Int. Cl.⁶ ................................................ A22C 21/00
[52] U.S. Cl. .......................................... 452/167; 452/154
[58] Field of Search ................................... 452/167, 166, 452/154

[56] References Cited

U.S. PATENT DOCUMENTS

| | | |
|---|---|---|
| 4,480,353 | 11/1984 | Martin et al. . |
| 4,635,317 | 1/1987 | Van Der Eerdren et al. .......... 452/167 |
| 4,709,448 | 12/1987 | McGuire et al. ....................... 452/167 |
| 4,896,399 | 1/1990 | Hazenbroer ............................ 452/167 |
| 5,035,673 | 7/1991 | Hazenbroer ............................ 452/167 |
| 5,173,077 | 12/1992 | Van Den Nieuwelaar et al. ... 452/167 |

FOREIGN PATENT DOCUMENTS

| | | |
|---|---|---|
| 381093 | 8/1990 | European Pat. Off. . |
| 442554 | 5/1994 | European Pat. Off. . |

*Primary Examiner*—Willis Little
*Attorney, Agent, or Firm*—Fay, Sharpe, Beall, Fagan, Minnich & McKee

[57] ABSTRACT

An apparatus for severing poultry legs at the knee joint is described. The poultry legs consisting of an thigh and drumstick are suspended from the distal end of the drumstick by a conveyor and are received in recesses in a synchronously revolving supporting disc just above the knee joint. Guide rails above and below the supporting disc push the leg against a projecting edge at the base of the recesses and progressively bend the leg in the natural bending position while simultaneously lifting it until the supporting edge lies in the crook of the knee joint. This position is maintained by means of openings in the disc in which the thigh is blocked and by webs extending downwards from the trailing flank of the recesses which likewise prevent the thigh from twisting out of alignment. A cutting device then severs the joint at an angle which halves the bending angle of the leg.

11 Claims, 1 Drawing Sheet

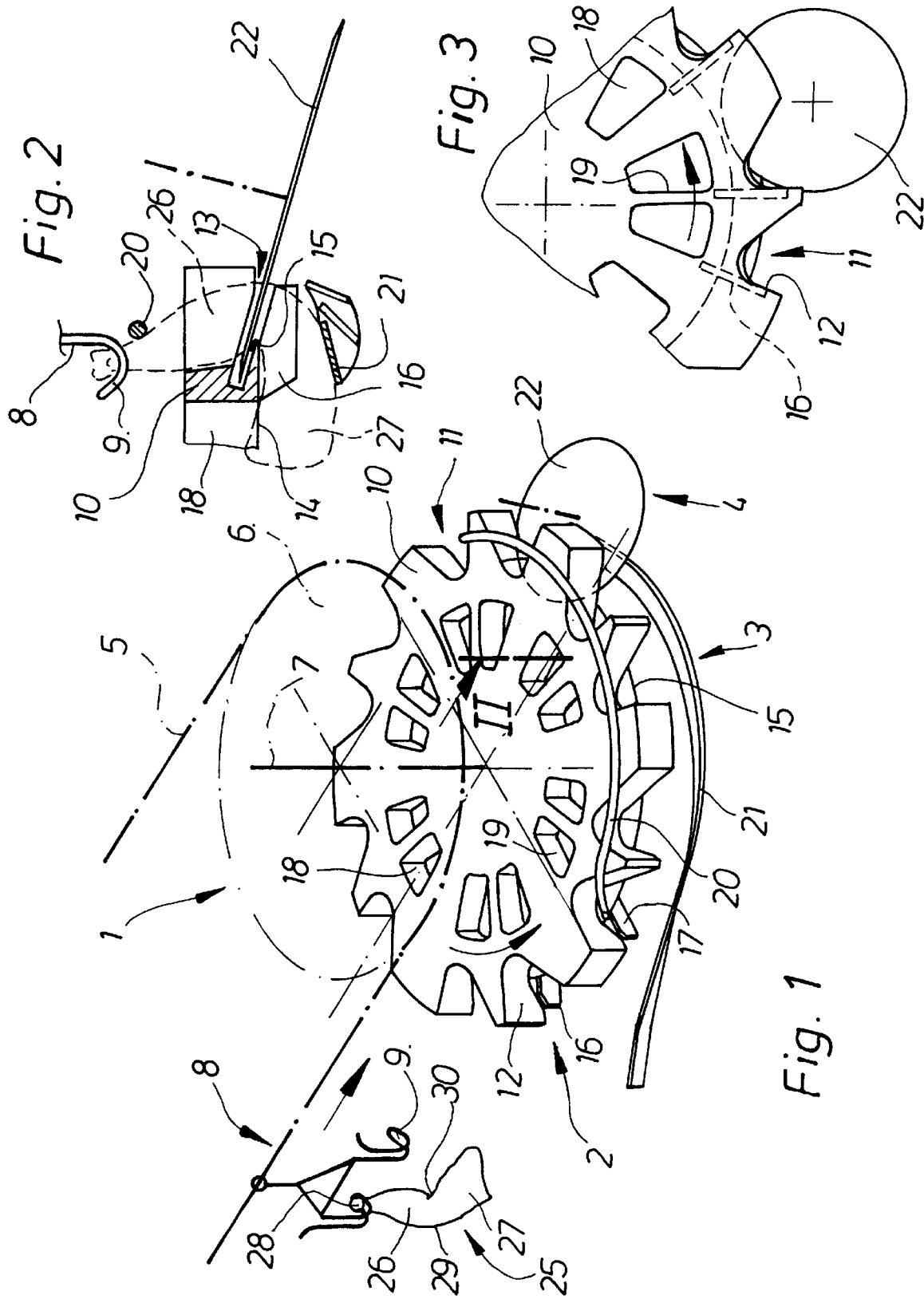

APPARATUS FOR PROCESSING POULTRY LEGS

BACKGROUND OF THE INVENTION

1. Field of the Invention

The invention concerns an apparatus for automatically severing poultry legs in the area of the knee joint, the poultry legs being separated from the body and respectively comprising an inside leg portion or thigh and a lower leg portion (shank), also, in the case of poultry and the like, termed drumstick, the apparatus comprising holders revolving in an essentially horizontal plane for holding the legs suspended at the distal end of the drumstick, means for supporting the legs, guiding means for guiding and aligning the legs and cutting means for severing the legs.

When processing poultry legs in this manner it is essential that the severing of the thigh from the drumstick occurs in such a manner that splintering or shaving off of the bone is avoided to ensure high quality of the resulting cuts.

2. Prior Art

EP 0 381 093 discloses an apparatus for cutting up a poultry body which is equipped with a station for dividing poultry legs which have been separated from the body in a previous operation. The legs are suspended from the ankle joint and conveyed around a support disc which has recesses arranged around its circumference for receiving the legs and is driven synchronously with the hanging conveyor. A knife for severing the legs is arranged at the periphery of the disc.

With this apparatus it is intended that the components of the knee joint be pulled apart by shear forces so that the leg can be severed cleanly between the ball and socket of the joint. A disadvantage is that such an operation can be achieved only when the apparatus is precisely adapted to the length of the drumstick of the leg being processed.

A further apparatus adapted to cut through the legs of animals, and specifically poultry, near the knee joint is disclosed in EP 0 442 554. In this apparatus the legs are conveyed while suspended from the ankle joint and positioned with respect to a cutting device by elements which act on the knee cap before the cutting device severs the leg from the rear of the naturally bent knee. In order that the legs may be correctly positioned prior to the cutting operation several positioning elements are required which are individually controlled to act on the poultry leg in a strict order. The resulting apparatus is consequently very complex and costly to manufacture and to maintain.

OBJECTS OF THE INVENTION

It is thus an object of the present invention to provide an apparatus for severing poultry legs which is of simple construction. It is a further object of the present invention to provide such apparatus which is capable of producing separated drumsticks thighs, of a high quality.

It is a further important object of the invention to provide an apparatus for severing poultry legs which can reliably sever the thigh from the drumstick of poultry legs of any possible dimension without damaging the bones.

SUMMARY OF THE INVENTION

In an apparatus for automatically severing poultry legs in the region of the knee joint, which apparatus comprises holders revolving in an essentially horizontal plane for holding the legs suspended at the distal end of the drumstick, means for supporting the legs, guiding means for guiding and aligning the legs and cutting means for severing the legs, these and further objects are achieved when the means for supporting the legs comprise a supporting disc rotating in an essentially horizontal plane and having recesses in its periphery which overlap the path of the legs and comprise a supporting edge for receiving and supporting the poultry legs in the crook of the knee joint, aligning means being provided at the underside of the disc for radially positioning the thighs with respect to the axis of rotation of the supporting disc, and when the guiding means comprise at least an upper guide rail adapted to lie in contact with the outer surface of the drumstick and a lower guide rail adapted to lie in contact with the outer surface of the thigh.

With an apparatus having this construction the poultry legs are, in a highly reliable manner, precisely oriented prior to the severing operation and securely held in this correct orientation by the aligning means throughout the severing of the drumsticks from the thighs irrespective of the length of legs as a whole and specifically the drumsticks.

In a preferred embodiment of the invention the precise orientation of the poultry leg for optimising the cutting position can be ensured by arranging the lower guide rail such that it lifts and presses against the thigh causing the bending angle between the latter and the drumstick to be reduced while simultaneously pressing the back of the knee against the supporting edge. This effect is advantageously further enhanced when the lower guide rail is resiliently biased towards the axis of the supporting disc.

The cutting precision is still further enhanced according to a further advantageous embodiment of the invention when the upper guide rail is arranged to cause the distal end of the drumsticks to move upwards within the holders releasing the firm grip of the holders and so reducing the holding forces which can impair the alignment of the poultry legs.

In order to ensure the maintenance of the position of the knee joint the alignment means can be formed as openings in the support disc lying in essentially the same radial extension as the recesses and into which at least the proximal ends of the thighs can penetrate as the knee is bent around the supporting disc. This function can be further improved when a radially extending support surface projecting below the supporting disc is arranged to extend flush with the leading flank of the corresponding recess.

BRIEF DESCRIPTION OF THE DRAWINGS

Further objects and advantageous of the present invention will be apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 shows a detail of a processing system for cutting up poultry bodies with a perspective view of the apparatus according to the invention;

FIG. 2 shows a partial radial sectional view through the apparatus of FIG. 1 along the line II—II; and FIG. 3 shows a partial plan view of the apparatus of FIG. 1.

DETAILED DESCRIPTION OF THE DRAWINGS

The apparatus according to the invention comprises a machine frame, which is shown and need not be discussed in detail here. This frame carries a conveyor 1, a poultry leg supporting arrangement 2, a guide structure 3 for guiding the poultry legs and a cutting device 4 for severing the legs.

The conveyor 1 is formed as an endless chain conveyor 5 which is guided to run through the whole poultry cut-up system. The chain conveyor 5 is guided by means of deflection rollers rotating about vertical axes. One of these deflection rollers 6 having an axis 7 is schematically illustrated in FIG. 1. The chain conveyor 5 is provided with suspended shackles 6 equidistantly spaced along its length. These shackles 6 comprise two hangers 9, each, arranged one behind the other in the conveying direction for holding poultry legs 25 at the ankle joint 28 of the drumsticks 26. The hangers are locked to prevent rotation in the region of the deflection roller 6.

The leg supporting arrangement 2 is disposed below the path of the shackles 8 and comprises a circular supporting disc 10 concentrically mounted to rotate about the axis 7. The position of the supporting disc 10 is vertically adjustable to permit modification of the distance between the disc 10 and the shackles 8. The supporting disc 10 is provided around its periphery with recesses 11 which are formed by an essentially saw-tooth-shaped design of the disc circumference. The trailing flanks 12 of the recesses 11 when viewed in the direction of rotation extend essentially radially. The spacing between recesses 11 corresponds alternately to the distance between the hangers 9 of each shackle 8 and the distance between or the pitch of adjacent shackles 8. The radius of the curve described by the rotating recesses 11 corresponds to the that of the holders 9 of the shackles 8. The supporting disc 10 is further provided at its periphery with a radial groove 13 inclined to the plane of rotation of the disc 10. The groove 13 extends inwardly from the periphery of the disc 10 to the base of the recesses 11. At the lower edge of the radial groove 13 the disc 10 radius is larger than at the upper edge so that the lower groove edge projects outwardly into the recesses forming a support edge 15. On the underside 14 of the disc 10, the outer walls or flanks 12 of the recesses 11 extend downwardly beyond the radial groove 13 into webs 16 which project from the underside 14 of the supporting disc 10 and comprise faces 17 which lie flush with the trailing recess flanks 12.

The supporting disc 10 is further provided with roughly trapezoidal-like openings 18 each of which is radially aligned with a corresponding recess 11 and extends through the disc 10. This trapezium form is particularly well adapted to accommodate the thighs or thighs of poultry. The openings 18 comprise two radially extending sides 19, the trailing side 19 extending in parallel and flush with the trailing flank 12 of the corresponding recess 11 and thus with the face 17 of the respective web 16.

The guiding structure 3 comprises an upper frame-fixed guide 20 of circular cross-section extending concentrically with the supporting disc 10 and directly above the path described by the recesses 11 and a lower guide rail 21 disposed below the supporting disc 10 which likewise extends essentially concentrically with the disc 10 directly below the recesses 11. The lower guide rail 21 is essentially rectangular in section with a longer face acting as a supporting surface for the thigh 27 of the poultry leg 25, as can be taken, in detail, form FIG. 2. At the receiving end—on the left hand side of FIG. 1—, the guide rail 21 extends essentially tangentially to the circumference of the disc 10 and the supporting surface extends almost vertically to engage the freely suspended thighs 27 of the poultry legs 25. As shown in FIGS. 1 and 2, the guide rail 21 is twisted along its length and describes a curve with a slight but progressively decreasing radius so that at its termination point at the cutting device 4 the supporting surface extends almost horizontally and below the path described by the recesses 11. This twisted form acts on the poultry legs 25 to simultaneously fold the thigh 27 of the leg 25 under the supporting disc 10 and lift the leg 25 so that the crook 30 of the knee lies snuggly around the supporting edge 15.

The cutting device 4 comprises a circular knife 22 which is driven to rotate in a plane inclined to the plane of rotation of the supporting disc 10 such that it penetrates into the radial groove 13 of the disc 10 and beyond the bases of the recesses 11 as shown in FIG. 2. The cutting device 4 is vertically adjustable with the supporting disc 10 so that the relative position of the circular knife 22 and the supporting disc 10 remains constant.

In the following, the operation of the apparatus according to the invention is described. It is assumed that the apparatus is integrated in a processing system having a conveyor 1 which conveys the legs 25 to be processed suspended from the ankle joints 28 in shackles 8 with the knee cap 29 pointing outwards in the arrangement illustrated in FIG. 1. As the shackles 8 enter the operational area of the apparatus they are guided by the conveyor 1 in a circular path around the deflection roller 6 so that the legs 25 are received in the recesses 11 of the supporting disc 10 under the supporting influence of the guide structure 2. The legs are transferred to the supporting disc 10 with the knee joint 29 roughly at the level of the radial groove 13 of the supporting disc 10. As the conveyor 1 advances and the supporting disc 10 rotates, the thigh 27 is guided inwardly towards the axis 7 of the disc 10 by the twisted surface of the lower guide rail 21 while the supporting edge 15 acts as a counter support for the leg 25 so that the angle between thigh 27 and drumstick 26 gradually becomes smaller. The distance between the supporting disc 10 and the path of the shackles 8 is initially set such that the supporting edge 15 does not rest directly in the crook of the knee 30 but slightly above it on the drumstick 26. As the angle of the leg 25 is progressively reduced by the action of the lower guide rail 21 the knee 29 will gradually be lifted until the supporting edge 15 finally sits exactly in the crook 30 of the knee prior to the leg 25 reaching the cutting device 4. At this point, the lower guide rail 21 holds the thigh 27 folded so far around the supporting edge 15 that the proximal end of the thigh 27 penetrates into the corresponding opening 18 as shown in FIG. 2. At the same time, the frictional forces of the guide elements 20 and 21 cause the thigh 27 to lie against the face 17 of the web 16 and the flank 19 of the opening 18 lying flush with this face 17 thereby ensuring that the leg 25 is held fixed and radially aligned with the supporting disc 10.

The combination of the positioning of the crook of the knee about the supporting edge 15 and the bending of the leg cause the plane of the knee joint to become aligned with the plane of the radial groove 13. The circular knife 22 of the cutting device 4 can then sever the joint precisely and without nicking the surrounding bones. The groove 13 preferably lies in a plane oriented such that it divides the angle between the drumstick 26 and the thigh 27 in two. This is the optimal cutting angle for the knee joint.

The counter force for the bending action is provided by the upper circular guide 20 which lies against the drumstick of the leg 25. As the leg 25 is lifted by the twisted profile of the lower guide rail 21, the ankle joint 28 of the drumstick is also raised. The upper guide 20 is curved to lift the ankle joint upwards within the hanger 9 of the shackle 8 so that it becomes released from the rigid hold and can move freely in order to facilitate the positioning of the leg with the crook of the knee 30 around the supporting edge 15.

Due to the bending and lifting action of the upper and lower guides 20, 21, poultry legs of all sizes will automatically assume the correct position around the supporting disc with the crook of the knee joint centred on the supporting edge 15. The machine can thus reliably and accurately process batches of poultry legs without adjustment once a rough initial adjustment of the distance between the supporting disc 10 and the shackles 8 to a value lying below the length of the smallest drumstick to be processed has been carried out.

We claim:

1. An apparatus for automatically severing poultry legs about the knee joint, the poultry legs being separated from the body and respectively comprising an thigh and a drumstick linked by the knee joint, the apparatus comprising holders 9 moved to revolve in an essentially horizontal plane about a fixed axis for holding the legs suspended at the distal end of the drumstick, means for supporting the legs, guiding means for guiding and aligning the legs and cutting means for severing the legs, wherein said means for supporting the legs comprise a supporting disc 10 rotating in an essentially horizontal plane and having recesses in its periphery which intersect the path defined by the legs for receiving each poultry leg, and a supporting edge being provided at the base of each recess for supporting each poultry leg in the crook of the knee joint, said guiding means comprise at least an upper guide rail disposed to lie in contact with the outer surface of said drumsticks and a lower guide rail disposed to lie in contact with the outer surface of said thighs, said guide rails being adapted to lift and bend said legs about said supporting edge progressively as said legs are advanced by said holders, and aligning means are provided at the underside of the disc for radially positioning said folded up thighs with respect to the axis of rotation of the supporting disc.

2. An apparatus as claimed in claim 1, wherein said lower guide rail is disposed such that it presses against the thigh causing the bending angle between the thigh and drumstick to be reduced while simultaneously pressing the crook of the knee against said supporting edge.

3. An apparatus as claimed in claim 1 wherein said lower guide rail is resiliently biased towards said axis of the supporting disc.

4. An apparatus as claimed in claim 1, wherein said upper guide rail is arranged with respect to the supporting disc to cause the distal end of the drumstick to move upwards within said holders and so reduce the holding forces on said distal end.

5. An apparatus as claimed in claim 1, wherein said alignment means comprise openings in said support disc lying in essentially the same radial extension as the recesses for receiving at least a portion of said thighs.

6. An apparatus as claimed in claim 5, wherein a support surface is disposed to extend below the supporting disc flush with the trailing flank of the corresponding recess when viewed in the direction of rotation of said disc.

7. An apparatus as claimed in claim 5, wherein said openings are through-holes in said supporting disc.

8. An apparatus as claimed in claim 5, wherein said openings are adapted to the form of the rear side of an thigh of poultry.

9. An apparatus as claimed in claim 1, wherein said cutting means comprise a driven circular knife disposed to over-lap the path of said supporting disc and cover said recesses, said circular knife being disposed in a plane inclined to the supporting disc which divides the angle of said bent poultry legs in two.

10. An apparatus as claimed in claim 1, wherein said supporting disc is provided with a radial groove extending from the periphery of said disc towards the axis of rotation, said radial groove lying in a plane inclined to the plane of said disc and adapted to accomodate a knife from said cutting means.

11. An apparatus as claimed in claim 1, wherein said supporting disc and said cutting means are vertically movable to permit the adjustment of the distance between said holders and said supporting disc.

* * * * *